Aug. 22, 1933.  H. V. HAYES  1,923,976
PORTABLE DIRECTION FINDER
Filed March 7, 1929   3 Sheets-Sheet 1

INVENTOR
Hammond V. Hayes
By
Ezekiel Wolf
ATTORNEY

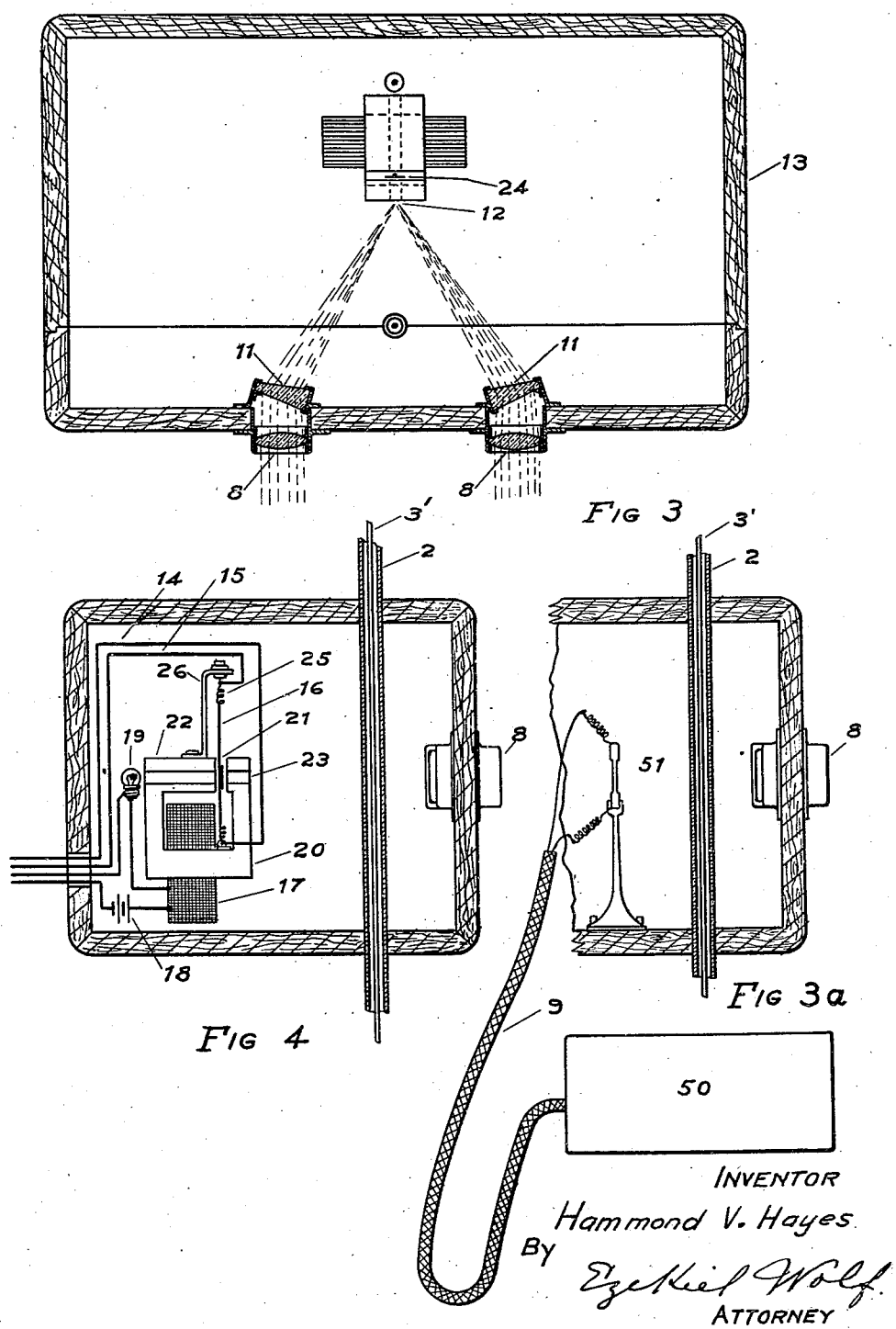

Aug. 22, 1933.                H. V. HAYES                  1,923,976
                     PORTABLE DIRECTION FINDER
                     Filed March 7, 1929    3 Sheets-Sheet 3

INVENTOR
Hammond V. Hayes
By
Ezekiel Wolf
ATTORNEY

Patented Aug. 22, 1933

1,923,976

UNITED STATES PATENT OFFICE 1,923,976

PORTABLE DIRECTION FINDER

Hammond V. Hayes, Boston, Mass., assignor to Submarine Signal Company, Boston, Mass., a Corporation of Maine Application March 7, 1929. Serial No. 345,171

3 Claims. (Cl. 250—11)

The present invention relates to the determination of direction by means of radiant energy and more particularly by means of electromagnetic waves.

In determining direction in this manner it is quite customary to employ a loop antenna mounted on a pivoted arrangement in connection with a magnetic compass and some means to indicate the horizontal direction of the axis of the loop or the direction of the source of electromagnetic waves, as indicated by the setting of the loop. This means quite commonly comprises a calibrated circular scale and disc having a line or arrow, both scale and disc concentric with the vertical axis of the loop and one fixed to the loop and moving with it in respect to the other. The whole apparatus is one device and often has the loop antenna situated above the pilot house when employed upon ship and the rest of the structure within the pilot house.

While such a device can usually be operated by the captain or the navigation officer of the boat, it is not frequently operated by them as their attention is thereby diverted from the work they are doing, such as directing the quartermaster or observing the course. This is particularly true in times of low visiblity, as in a fog when the observing officer is most reluctant to have his attention diverted from watching the water for vessels, lights, buoys or other signals. While he may be willing then for an instant to make a setting on a radio direction finder, he much prefers not to leave his place on the bridge unless it is necessary.

Another disadvantage with the radio direction finder, as ordinarily used, is that while the setting on the source from which the waves are coming is in most cases extremely accurate, nevertheless the officer, in going from the pilot house to the bridge and then looking in the general direction according to the bearing indicated by the setting on the instrument, has no particular guide to indicate the direction with the same exactitude as the setting by the direction determining instrument, so that for ordinary visual observations the extreme accuracy of the instrument is not usefully employed.

These disadvantages, as well as others, are overcome by the apparatus of the present invention and its methods.

In the present invention, instead of having the apparatus fixed in one position and rather heavy, the loop and the direction determining elements are portable and capable of being used in the open, as on the bridge of a boat.

The observer, in determining the direction, does not rotate the device but simply holds it up to his eyes and scans the horizon until he sees a signal which indicates that a ship or object emanating a source of electromagnetic waves is in the direction he is viewing. In this manner his observation immediately fixes the direction of sight of his eyes, as in the use of a telescope, and the operator simply keeps his sight fixed but removes the observing device and may then endeavor to locate the ship or object with his eyes. In fact, the sighting device may include a pair of binoculars in such a manner that the operator can use the device for locating the direction of the source of electromagnetic waves and without removing it from his eyes locate the object of source by vision as well.

The sighting of the object is preferably made visual by showing a light when the observer is looking in the right direction, in order to simulate the sighting of a light of a ship at night. The psychological advantage of such an arrangement is very great, particularly when there is a heavy fog which obscures the vision, as there often is at sea. The observer who may be a ship's officer takes up his binocular direction finder, sights the horizon and finally sees a light, which indicates to him that a ship is off in that particular direction. He removes the binoculars, or makes them so that he can get an actual view of the ocean, and endeavors to find the ship. Perhaps it is still too far away to see in a fog. He takes the instrument up a few seconds later and again sights in the same direction. He may again find the light there, and he immediately knows that if he does not make a change in the direction of his ship's course he is likely to have a collision. If the light has moved to another position, he will be fairly certain that there is little danger of collision and that the courses, if they do cross, will not cross in such a manner that both ships will be at the intersection of the courses at the same time. The light which he sights is, in effect, a substitute for the light on the mast and gives the ship an actual position in the navigator's field of view and operation as though the weather was clear and he could see the ship itself.

In the present invention the portable part includes the antenna loop and the binocular giving the light indication. This is one piece of apparatus and may conveniently be hung by a hook to the radio set used for amplifying the signal transmitted to the binocular. By taking the loop off the hook the set and apparatus may simultaneously be put into operation.

The apparatus necessarily demand that the objects be equipped with means for transmitting radiant and preferably electromagnetic waves. In the present system, which is extremely useful for preventing collision at sea, all vessels are preferably equipped with means for transmitting electromagnetic waves, and more particularly waves of short wave lengths, of the order of 5 meters or less. They need not be directional, but if they are, it is necessary to have them rotate so that the whole azimuth of 360° is covered in a reasonable time, as for instance, a minute, to enable an observing ship to take a setting.

By the use of short waves the small loop such as is adaptable to be portably handled becomes extremely accurate. A loop of less than two feet in its longest dimension can be usefully employed which will give directions with an accuracy similar to that obtained from the ordinary radio direction finder.

While the invention is applicable primarily for preventing collisions at sea between vessels, nevertheless it has other applications and may be used to determine the direction of any object emitting electromagnetic waves.

Without going into further details concerning the advantages and merits of the invention, it will now be described in connection with the annexed drawings showing an embodiment of the invention. In the drawings Figure 1 shows a front view of the apparatus;

Figure 3 shows a section of a part of the device taken on line 3—3 in Figure 1;

Figure 3a shows a modification of the device;

Figure 4 shows a section of a part of the device taken on line 4—4 of Figure 2;

Figure 1:
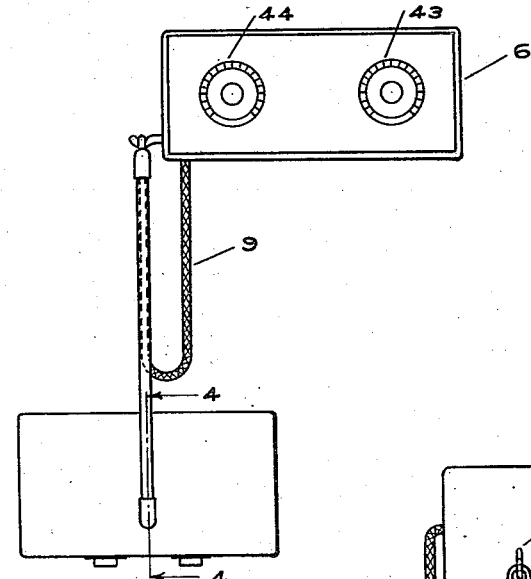
Figure 2:
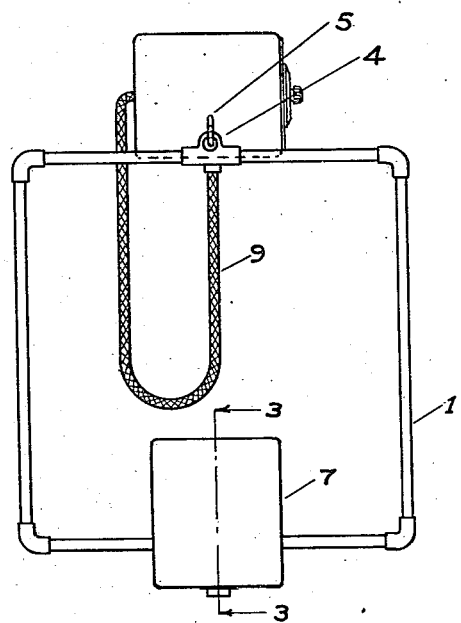
Figure 2 shows a side view of Figure 1.

The electromagnetic waves are preferably ordinarily picked up by a loop antenna as shown at 1 in Figure 1. While this antenna may be any shape within the ordinary limits of the known art, a square loop or circular loop of one turn is preferably used and this loop is approximately one-half wave length long in its greatest horizontal dimension. The loop is constructed of an outer insulating shell 2, within which is the conducting wire 3'. The outer insulating shell is preferably constructed of rigid material and watertight and is ordinarily suspended by an eye piece 4 which is hung over a hook 5 on the radio receiving set 6 which detects and transforms the radio waves so that they may give a proper indication in the indicating device 7. The hook 5 may, as in the ordinary telephone instrument, fly up when the weight of the loop is removed and make contacts to put the circuits in operation.

Figure 5:
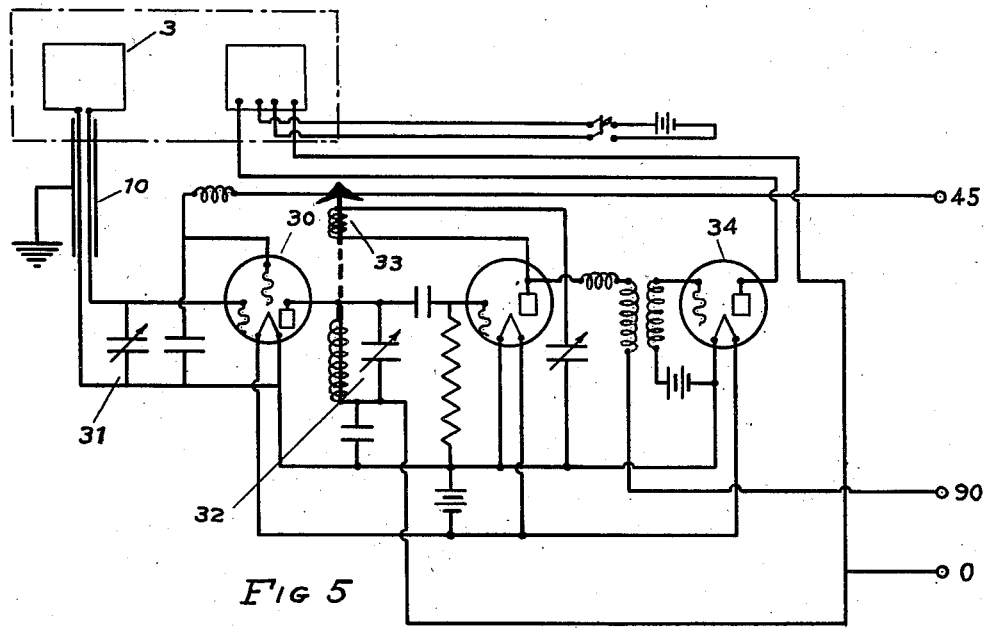
Figure 5 shows a circuit diagrammatically.

The indicating device and the loop are fixed firmly together and when the operator takes the loop off the hook he holds it so that his eyes sight into the eye pieces 8, 8 of the indicating device. A flexible cable 9, which has a grounded sheath 10, as shown in Figure 5, allows the loop to be moved about within a limited range and connects the loop to the receiving set 6.

The indicator is shown more particularly in Figures 3 and 4. It comprises a casing 13 having two eye pieces, one for each eye, and in back of each is a prism 11, 11 for conveying the light rays to the center point 12, where a light indication is made to appear when the sighting is in the proper position. The indication is given by the signal current sent over the wires 14 and 15 from the receiving set 6. This current travels down a wire 16 placed in a magnetic field and causes the wire 16 either to be pulled aside or vibrate. If the indication is made by direct or rectified current, the wire will be pulled aside and approximately proportionate to the current flowing through it, while if it is alternating the wire will vibrate with an amplitude dependent upon the magnitude of the current flowing through it. The wire may be tuned acoustically to the frequency of the alternating current vibrations and in that way the indicator may be made more sensitive than it otherwise would be.

The magnetic field is produced by means of an electromagnet as shown in Figure 4, comprising a coil 17 energized by the battery 18, which is also in series with a small point light 19. The coil has a core 20 which extends in a rectangular fashion forming an air gap 21. The upper arm 22, in which the air gap is cut, has a hole 23 through it longitudinally aligning the point of light 19 with the point 12 so that when the shutter 24 is removed and the light 19 illuminated the eye will see the light.

The wire 16 is preferably hung by spring suspension 25 from a bracket 26 supported on the arm 22 or in some other manner. At its lower end the wire 16 is fixed to the core 20 by the spring 27 and some suitable fastening means.

The wire 16 has, as shown in Figure 4, a shutter 24 which is fixed by shellac or in some other suitable manner to it before the hole 23. This shutter is just about wide enough to cover the hole 23 so that in its normal position no light from the lamp 19 will come through. If the hole 23 were made in the shape of a narrow slit, then the wire 16 may itself serve as the shutter in covering the hole 23.

When the current passes through the wire, as described above, the electrical force acts to pull the wire to the right or left, as shown in Figure 3, dependent upon the relative directions of the current and the magnetic flux, and the greater the current the stronger the pull.

Figure 6:
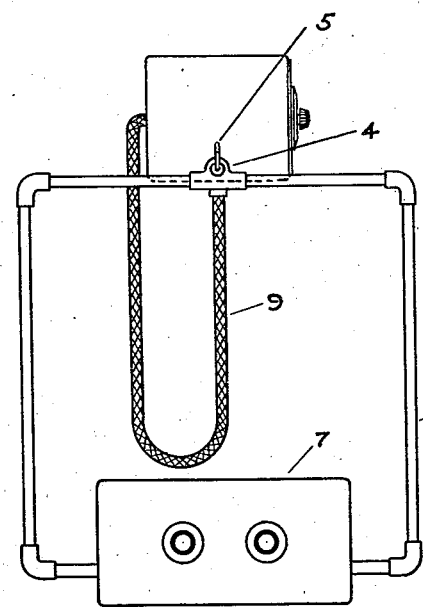
Figure 6 shows a modification of the device shown in Figure 1.

As shown in the figures, with the exception of Figure 6, the loop is perpendicular to a horizontal line drawn through the eye pieces. In this relation when the observer is facing the source of electromagnetic waves, the sides of the loop are aligned in that direction. The circuit shown in Figure 5 is preferably operated with the loop in the position just described, but it is also possible to operate the circuit and produce an indication with the loop in the same plane or parallel to a horizontal line drawn through the eye pieces, as shown in the modification of Figure 6.

In Figure 5, the terminals of the loop 3 serve as an input to a vacuum tube circuit, preferably employing a screen grid tube 30. The input circuit is tuned by the condenser 31. The output of the screen grid tube circuit is fed into a detector circuit by means of a tuned impedance 32, which has an adjustable feed back coupling 33 which can be used to make the circuit oscillate, provided a continuous wave is being received and a beat note is desired. Otherwise the coupling can be used as a regenerative amplifier.

The detector output is fed into an amplifier tube 34 in the plate circuit of which the indicator is connected directly or by transformer action. A transformer can be usefully used in the present device where the resistance load is low to step down the voltage and increase the current change in the indicator wire. This will make the indicator even more sensitive than ordinarily. In fact, with the combination indicated in the drawings, of a galvanometer type indicator and a vacuum tube circuit, it is possible to operate the indicator with only a little amplification of the signal. In the present invention two stages, one radio frequency and one of lower frequency, have proved sufficient amplification in connection with the indicator used to produce a reliable indication. If a different type of indicator were used, as for instance a flashing light, about ten stages of amplification would be necessary.

In addition to the above remarks, it should be noted that the signal need not be reduced to audio frequency. The signal may be at an inaudible frequency, as long as it makes the vibrating wire respond to it. The amplitude of vibration and not the frequency gives the intensity of the indication.

In the operation of the device, the operator may look about until the loop is pointing in the direction of the electromagnetic waves. As the loop gradually comes into that position, the energy picked up by the loop will be increased and the intensity of the light, as seen by the operator in looking through the eye pieces, will be increased. The operator moves the loop back and forth until he finds the position of maximum luminosity and then he knows he is looking in the direction of the object or ship. It appears as if his spy glass has found a ship.

Figure 7:
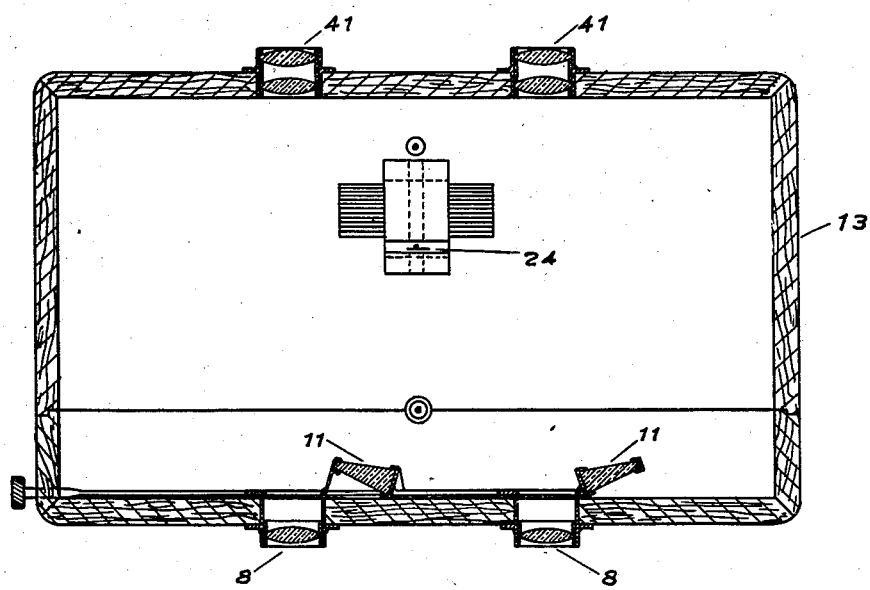
Figure 7 shows another modification which may be applied to the device.

As shown in Figure 7, provision may be made for removing the prisms by pressing the button 40, in which case the eyes can view the actual horizon through the object pieces 41—41. Or the operator can take down the binoculars and look in the direction his eyes are facing without the necessity of associating it with an azimuth bearing.

If the operator desires to set on a minimum, a device like that shown in Figure 6 can be provided, in which the loop and the eye pieces are in the same or parallel planes. Here the operator looks about until the light vanishes, at which time he is looking in the direction of the electromagnetic source of waves. The loop may be made adjustable so that it can be used either as shown in Figure 6 or Figure 1, by suitable adjustable fastening brackets, or in any other manner.

The receiving circuit has been described above in sufficient detail, it is believed. It may be remarked, however, that the circuit can be tuned within range by variable capacities, as shown at 43 and 44. While the circuit and combination of circuit and indicator, as described, have been preferred to other adaptations, nevertheless it will be understood that various combinations can be used to aid in the determination of direction of the emanating energy source without departing from the spirit of the invention.

In place of an indicator as shown in Figure 3, a discharge tube 51, Figure 3a, might be used. This could be operated directly off the set 6, or through a special amplifier and relay control 50, of the type described in the application of Edwin E. Turner, Jr., Serial No. 270,660, filed April 17, 1928, Div. 51.

Having now described my invention, I claim:

1. In a system for determining the direction of radio waves, a portable unit comprising a loop antenna and an indicating device attached to said loop, said indicating device comprising a source of continuous illumination, means for setting up a magnetic field, a current conducting wire suspended in said field and normally confining the light of the source of continuous illumination, and means for viewing the indication produced by operation of said wire exposing said source.

2. A system for determining the direction of a source of electromagnetic waves comprising as a unit, a directional antenna, and means fixed with reference to said directional antenna for sighting the directional antenna to determine the direction of the electromagnetic waves including an indicator bearing a fixed position in the line of vision of the sighting means and means for producing an indication when the antenna is correctly sighted by the observer.

3. In a system for determining the direction of radio waves, a portable unit comprising a directional receiving antenna and an indicating device attached to said antenna, a receiving set comprising a separate unit, flexible connections adapted to connect the antenna to the receiving set and the latter to the indicator, means for visually observing said indicator only from a single direction, said direction being fixed with respect to the antenna whereby the observer will be looking in the direction of the source upon the observation of an indication.

HAMMOND V. HAYES.